United States Patent
Abbott et al.

(10) Patent No.: US 9,510,507 B1
(45) Date of Patent: Dec. 6, 2016

(54) OVERHANGING TINES FOR ORIENTING BAST STALKS

(71) Applicant: HBI Branded Apparel Enterprises, LLC, Winston-Salem, NC (US)

(72) Inventors: Michael D. Abbott, Statesville, NC (US); Robert A. Miller, New Ringgold, PA (US)

(73) Assignee: HBI Branded Apparel Enterprises, LLC, Winston Salem, NC (US)

( * ) Notice: Subject to any disclaimer, the term of this patent is extended or adjusted under 35 U.S.C. 154(b) by 0 days.

(21) Appl. No.: 14/811,204

(22) Filed: Jul. 28, 2015

Related U.S. Application Data

(63) Continuation of application No. 14/146,152, filed on Jan. 2, 2014, now Pat. No. 9,107,342, which is a (Continued)

(51) Int. Cl.
| | |
|---|---|
| *A01D 45/00* | (2006.01) |
| *A01D 41/12* | (2006.01) |
| *A01D 45/06* | (2006.01) |
| *A01D 41/06* | (2006.01) |
| *A01D 43/00* | (2006.01) |
| *A01D 61/02* | (2006.01) |

(Continued)

(52) U.S. Cl.
CPC .............. *A01D 41/12* (2013.01); *A01D 41/06* (2013.01); *A01D 43/006* (2013.01); *A01D 45/065* (2013.01); *A01D 61/02* (2013.01); *A01D 82/00* (2013.01); *A01F 15/00* (2013.01)

(58) Field of Classification Search
CPC ...... A01D 45/10; A01D 61/02; A01D 75/282; A01D 43/006; A01D 45/006; A01D 45/06; C13B 10/025

USPC .......... 56/327.1, 13.9, 14.5, 16.4 B; 171/127
See application file for complete search history.

(56) References Cited

U.S. PATENT DOCUMENTS

| | | |
|---|---|---|
| 19,394 A | 2/1858 | Whipple |
| 34,619 A | 3/1862 | Comly |

(Continued)

FOREIGN PATENT DOCUMENTS

| | | |
|---|---|---|
| BE | 893541 | 12/1982 |
| DE | 3639022 | 4/1988 |

(Continued)

OTHER PUBLICATIONS

Bast Fibre Processing by VDE, Declerck et al., 9 pages, Date 1998.

(Continued)

*Primary Examiner* — Árpád Fábián-Kovács
(74) *Attorney, Agent, or Firm* — Fish & Richardson P.C.

(57) ABSTRACT

An apparatus for harvesting bast stalks includes a cutting device and a first moving belt. The cutting device is configured to receive bast stalks includes at least one cutter at a front end of the apparatus, where the cutter is configured to cut bast stalks from bast plants. The first moving belt has a first end for receiving the cut bast stalks from the cutter, a second end, and a top surface configured to move the cut bast stalks between the first end and the second end. The apparatus includes a plurality of spaced tines extending toward the top surface of the first belt to orient a substantial majority of the bast stalks generally parallel to each other and generally along the direction the first moving belt is configured to move.

9 Claims, 5 Drawing Sheets

Related U.S. Application Data continuation of application No. 13/074,778, filed on Mar. 29, 2011, now Pat. No. 8,635,844.

(51) Int. Cl.
*A01D 82/00* (2006.01)
*A01F 15/00* (2006.01)

(56) References Cited

U.S. PATENT DOCUMENTS

| | | |
|---|---|---|
| 59,503 A | 11/1866 | Clemens |
| 464,056 A | 12/1891 | Armstrong |
| 559,354 A | 5/1896 | Birchall |
| 593,772 A | 11/1897 | Linneborn |
| 611,108 A | 9/1898 | Drury |
| 701,770 A | 6/1902 | Smith |
| 738,783 A | 9/1903 | Ellis |
| 738,893 A | 9/1903 | Ellis |
| 874,460 A | 12/1907 | Vessot |
| 1,327,297 A | 1/1920 | Summers |
| 1,531,320 A | 3/1925 | Summers |
| 1,803,131 A * | 4/1931 | Pierson .................... A01F 12/44 460/100 |
| 1,835,454 A | 12/1931 | Bartosz |
| 2,111,925 A | 3/1938 | Eves |
| 2,111,926 A | 3/1938 | Eves |
| 2,208,287 A | 7/1940 | Cochrane |
| 2,296,524 A | 9/1942 | Heritage |
| 2,313,791 A | 3/1943 | Widger |
| 2,316,590 A | 4/1943 | Johnson |
| 2,338,308 A | 1/1944 | Thompson |
| 2,346,585 A | 4/1944 | Job |
| 2,387,796 A | 10/1945 | Jones |
| 2,391,977 A | 1/1946 | Johansen |
| 2,460,448 A | 2/1949 | Cook |
| 2,468,771 A | 5/1949 | Montonna et al. |
| 2,667,733 A | 2/1954 | Bolelli |
| 2,675,809 A * | 4/1954 | Aber et al. ............ A01D 75/282 209/27 |
| 2,741,894 A | 4/1956 | Schulze |
| 2,883,826 A | 4/1959 | Smith et al. |
| 2,891,368 A | 6/1959 | Yovanovich |
| 2,905,974 A | 9/1959 | Cary et al. |
| 3,247,909 A | 4/1966 | Vautin |
| 3,352,229 A | 11/1967 | Morse et al. |
| 3,420,239 A * | 1/1969 | Lorenzen ............. A01D 45/006 171/27 |
| 3,470,682 A | 10/1969 | Evans |
| 3,508,557 A | 4/1970 | Sunday |
| 3,529,714 A | 9/1970 | Converse et qal. |
| 3,567,511 A * | 3/1971 | Tilby .................... C13B 10/025 127/2 |
| 3,651,624 A | 3/1972 | Bandemer |
| 3,670,490 A | 6/1972 | Kneafsey |
| 3,705,483 A | 12/1972 | Jarrell et al. |
| 3,716,981 A | 2/1973 | Bok |
| 3,872,545 A | 3/1975 | Altosaar |
| 3,976,498 A * | 8/1976 | Tilby ........................ C13B 5/04 127/2 |
| 3,979,177 A | 9/1976 | Selling et al. |
| 4,175,621 A * | 11/1979 | Seem .................... A01D 45/006 171/14 |
| 4,195,958 A | 4/1980 | Vahlkamp et al. |
| 4,241,474 A | 12/1980 | Doutre |
| 4,261,163 A | 4/1981 | Shaw |
| 4,524,572 A * | 6/1985 | Wilde .................... A01D 45/008 171/28 |
| 4,572,741 A | 2/1986 | Mason |
| 4,584,824 A * | 4/1986 | Hiyamuta ............. A01D 45/10 56/13.9 |
| 4,743,307 A * | 5/1988 | Mason .................... C13B 5/04 127/2 |
| 4,884,393 A * | 12/1989 | Hilleby ................ A01D 61/02 198/834 |
| 5,020,311 A | 6/1991 | Matthies |
| 5,036,653 A | 8/1991 | Klinner |
| 5,103,626 A | 4/1992 | Morrison |
| 5,255,501 A | 10/1993 | McWilliams |
| 5,323,774 A | 6/1994 | Fehlauer |
| 5,463,856 A | 11/1995 | Beckwith |
| 5,466,188 A | 11/1995 | Schaal et al. |
| 5,480,353 A * | 1/1996 | Garza, Jr. ............. A01D 45/006 171/27 |
| 5,513,805 A | 5/1996 | Fisher et al. |
| 5,632,135 A | 5/1997 | Baker et al. |
| 5,666,696 A | 9/1997 | Costard |
| 5,752,374 A | 5/1998 | Allworden et al. |
| 5,816,036 A | 10/1998 | Caillouet |
| 5,916,798 A | 6/1999 | Lund et al. |
| 5,964,081 A | 10/1999 | Ingram |
| 5,970,700 A | 10/1999 | Scheerer et al. |
| 6,032,446 A | 3/2000 | Gola et al. |
| 6,062,009 A * | 5/2000 | Caillouet ............... A01D 45/10 460/100 |
| 6,230,477 B1 | 5/2001 | Caillouet |
| 6,250,060 B1 | 6/2001 | Scheerer et al. |
| 6,257,978 B1 * | 7/2001 | Meester ............... A01D 45/006 460/145 |
| 6,263,650 B1 * | 7/2001 | Deutsch ............... A01D 46/082 56/16.4 B |
| 6,357,083 B1 | 3/2002 | Stratton et al. |
| 6,363,700 B1 | 4/2002 | Fowler |
| 6,421,992 B1 | 7/2002 | Goering et al. |
| 6,421,996 B1 | 7/2002 | Deutsch et al. |
| 6,539,585 B1 | 4/2003 | Anthony |
| 6,615,454 B1 | 9/2003 | Anthony |
| 6,685,748 B1 | 2/2004 | Day et al. |
| 6,805,718 B2 | 10/2004 | Barfoed et al. |
| 6,820,406 B2 | 11/2004 | Khavkine et al. |
| 6,912,876 B2 | 7/2005 | Wallis et al. |
| 6,979,491 B2 | 12/2005 | Yan et al. |
| 7,468,333 B2 | 12/2008 | Kimbrell, Jr. et al. |
| 7,481,843 B2 | 1/2009 | Xu |
| 7,520,214 B2 | 4/2009 | Dehondt |
| 7,669,292 B2 | 3/2010 | Chute et al. |
| 7,918,160 B2 | 4/2011 | Roy |
| 8,404,006 B2 | 3/2013 | Weigelt |
| 8,475,628 B1 | 7/2013 | Abbott et al. |
| 8,635,844 B1 | 1/2014 | Abbott et al. |
| 2003/0157323 A1 | 8/2003 | Khavkine et al. |
| 2003/0186730 A1 | 10/2003 | Hoskinson et al. |
| 2003/0226215 A1 | 12/2003 | Barfoed et al. |
| 2004/0191888 A1 | 9/2004 | Clarke et al. |
| 2005/0086921 A1 | 4/2005 | Bares et al. |
| 2007/0094810 A1 | 5/2007 | Xu |
| 2007/0175197 A1 | 8/2007 | Dehondt |
| 2007/0199669 A1 | 8/2007 | Yang et al. |
| 2008/0096001 A1 | 4/2008 | Emden et al. |
| 2008/0096621 A1 | 4/2008 | Perret |
| 2008/0141639 A1 | 6/2008 | Shields |
| 2009/0007538 A1 | 1/2009 | Cheng et al. |
| 2009/0019826 A1 | 1/2009 | Rigney |
| 2009/0092835 A1 | 4/2009 | Xu |
| 2009/0095662 A1 | 4/2009 | Redekop et al. |
| 2009/0107348 A1 | 4/2009 | Noonan et al. |
| 2009/0124309 A1 | 5/2009 | Redekop et al. |
| 2009/0193777 A1 | 8/2009 | Wendling |
| 2009/0293443 A1 | 12/2009 | Silver |
| 2009/0308042 A1 | 12/2009 | Lovett et al. |
| 2010/0147472 A1 | 6/2010 | Sung et al. |
| 2010/0267432 A1* | 10/2010 | Roberge ............. A01D 41/1252 460/59 |
| 2010/0285569 A1 | 11/2010 | Xiao et al. |
| 2010/0307121 A1 | 12/2010 | Marchini |
| 2010/0330337 A1 | 12/2010 | Dillon |

FOREIGN PATENT DOCUMENTS

| | | |
|---|---|---|
| DE | 3735235 | 4/1989 |
| DE | 3815771 | 11/1989 |
| EP | 0332726 | 9/1989 |
| EP | 0398421 | 11/1990 |

(56) References Cited

FOREIGN PATENT DOCUMENTS

| | | | |
|---|---|---|---|
| EP | 562541 | 9/1993 | |
| FR | 2866515 | 8/2005 | |
| GB | 167962 | 8/1921 | |
| GB | 218665 | 9/1925 | |
| GB | 2205865 | 12/1988 | |
| RU | 2141191 | 11/1999 | |
| RU | 2141191 C1 * | 11/1999 | ............ A01D 45/06 |
| SU | 858632 | 8/1981 | |
| WO | WO9801611 | 1/1998 | |
| WO | WO9845514 | 10/1998 | |
| WO | WO0002433 | 1/2000 | |
| WO | WO0044968 | 8/2000 | |
| WO | WO0148300 | 7/2001 | |
| WO | WO2004057942 | 7/2004 | |
| WO | WO2007140578 | 12/2007 | |
| WO | WO2009092865 | 7/2009 | |

OTHER PUBLICATIONS

David McAlister, III, et al. Cotton Fibers: Properties and Interaction with Flax Fibers in Blends (Focus on Rotor Spun Yarn), United States Department of Agriculture, Agricultural Research Service, Mar. 15, 2004. http://www.ars.usda.gov/research/publications/publications.htm?seq_no_115=146395.

Flax Council of Canada. Growing Flax. http://www.flaxcouncil.ca/english/index.jsp?p=growing12&mp=growing.; date unknown, available as of filed date Flax Counsel of Canada. Harvesting. htttr//www.flaxcouncil.ca/english/print.jsp?p=growing10&mp=growing; date unknown, available as of filed date.

John A. Foulk, et al. Fiber Flax Farming Practices in the Southeastern United States, Plant Management Network. Crop Management, Jan. 24, 2003.

John A. Foulk, et al. Flax-cotton Fiber Blends: Miniature Spinning, Gin Processing, and Dust Potential, ScienceDirect, Industrial Crops and Products 25, 2007, 8-16, 25, Elsivier. http://ddr.na1.usda.aov/bitstream/10113/19324/1 /IND43888517.pdf.

Manitoba Agriculture, Food and Rural Initiatives, www. Gov.mb.ca/agriculture/crops/hemp/bko05s12.html, Fibre Production, 2 pages, No date.

Rosalie Marion Bliss, Flax Fiber Offers Cotton Cool Comfort, Agricultural Research Magazine, Nov. 2005, 53(11 ). http://www.ars.usda.gov/is/ar/archive/nov05/fiber/1105.htm?pf=1.

Swicofil AG Textile Services. Natural Fibres/Synthetic Fibres: Flax (Linen). htt1:1://swicofil.com/Qroducts/003flax.html; date unknown, available as of filing date.

Tadeusz Jackowski, et al. Modelling of the Relationship Between Feeding Sliver Structures and Parameters of Cotton/Linen Blended Yarns, Fibres and Textiles in Eastern Europe, Apr./Jun. 2003, 12-17, 11:2(41). Http://www.fibtex.lodz.pl/41_06/_12.pdf.

Waldemar Cierpucha, at al. Applicability of Flax and Hemp as Raw Materials for Production of Cotton-like Fibres and Blended Yarns in Poland, Fibres and Textiles in Eastern Europe, Jul./Oct. 2004, 13-18, 12:3(47). Http://fibtex.lodz.pl/47_06_13.pdf.

* cited by examiner

OVERHANGING TINES FOR ORIENTING BAST STALKS

CROSS-REFERENCE TO RELATED APPLICATIONS

This application is a continuation of and claims the benefit of priority to U.S. patent application Ser. No. 14/146,152, filed Jan. 2, 2014, now issued as U.S. Pat. No. 9,107,342, which is a continuation of U.S. patent application Ser. No. 13/074,778, filed Mar. 29, 2011,now issued as U.S. Pat. No. 8,635,844, each of which is incorporated by reference herein in its entirety. This application is also related to co-pending U.S. application Ser. No. 13/074,665, filed Mar. 29, 2011.

FIELD OF THE INVENTION

The present invention relates to an apparatus and process for harvesting bast plants, and particularly to orienting bast stalks while harvesting bast plants.

BACKGROUND OF THE INVENTION

Bast plants have a remarkable variety of uses. Bast fibers extracted from these plants are used in textiles, apparel, ropes and cordage, paper and composite fabrication, among other applications. The bast fibers can provide unique properties in textile structures while providing alternative, renewable, fiber supplies for cotton based and/or petroleum based fiber materials. Bast seeds yield oils for several end-uses, e.g., food grade oils, personal care products, paint additives, etc. Bast plants are compelling crops to harvest due to the broad uses, the wide geographic footprint most bast plants have for growing, and the typical yields.

Despite the variety of uses that bast plants generally have, bast plants have been developed toward either seed production or fiber production, but not necessarily seed and fiber production. More specifically, bast plants that primarily yield seeds for oil production and planting do not typically produce fibers suitable for textile production. Bast plants for seed production may have short fiber lengths and lower fiber yields. For example, flax plants (*Linum usitatissimum* L.) for fibers are taller, yield more fiber, have lower oilseed content and produce less seeds compared to flax plants grown for seed production. In addition, bast seed plant production substantially outpaces the production of bast fiber plants, thus bast fibers more suitable for textile applications have a limited supply.

Extracting fibers and seeds from bast plants and conditioning them into a state suitable for later use, e.g., fiber for yarn and fabric formation, is a complex and expensive process. Typically, bast plants are cut in the field and the stalks are allowed to rett for some period of time, e.g., a week to a month or more depending on climate. Retting begins the process of separating pertinacious materials from the fibers, and the fibers from the woody core of the plant. The retted stalks are then decorticated. There have, however, been advances in bast processing that minimize the need to field- or dew-rett bast stalks. Such advancements have given rise to new opportunities in harvesting bast plants in the field and present them for decortication. Decortication as used herein means removing the outer layers of the stalk and exposing the fibers. Following decortication, the fibers are intended for yarn formation, typically using long-line or wet-yarn spinning systems, as is known the art.

Harvesting through decortication, however, does not necessarily produce fibers suitable for modern high speed yarn spinning operations, e.g., cotton and/or cotton blend spinning systems. The amount of capital investment in process modifications required to process bast fibers on existing spinning systems exceeds the return running such fibers on those systems could provide.

There is a need, therefore, for an improved process for harvesting bast plants in the field, and packaging them in a form suitable for later processing.

SUMMARY OF THE INVENTION

A method and apparatus for harvesting bast plants having stalks, husks, and seeds that includes cutting the bast stalks from the bast plants and receiving the bast stalks onto a first belt. The method then orients at least a portion of the bast stalks on the first belt, the longitudinal axis of the at least a portion of the bast stalks being generally oriented in the direction the first belt is moving. The husks and seeds may be removed from the bast stalks. The bast stalks may be packaged.

These and other features, aspects, and advantages of the invention will be apparent from a reading of the following detailed description together with the accompanying drawings, which are briefly described below.

DETAILED DESCRIPTION

Figure 1:
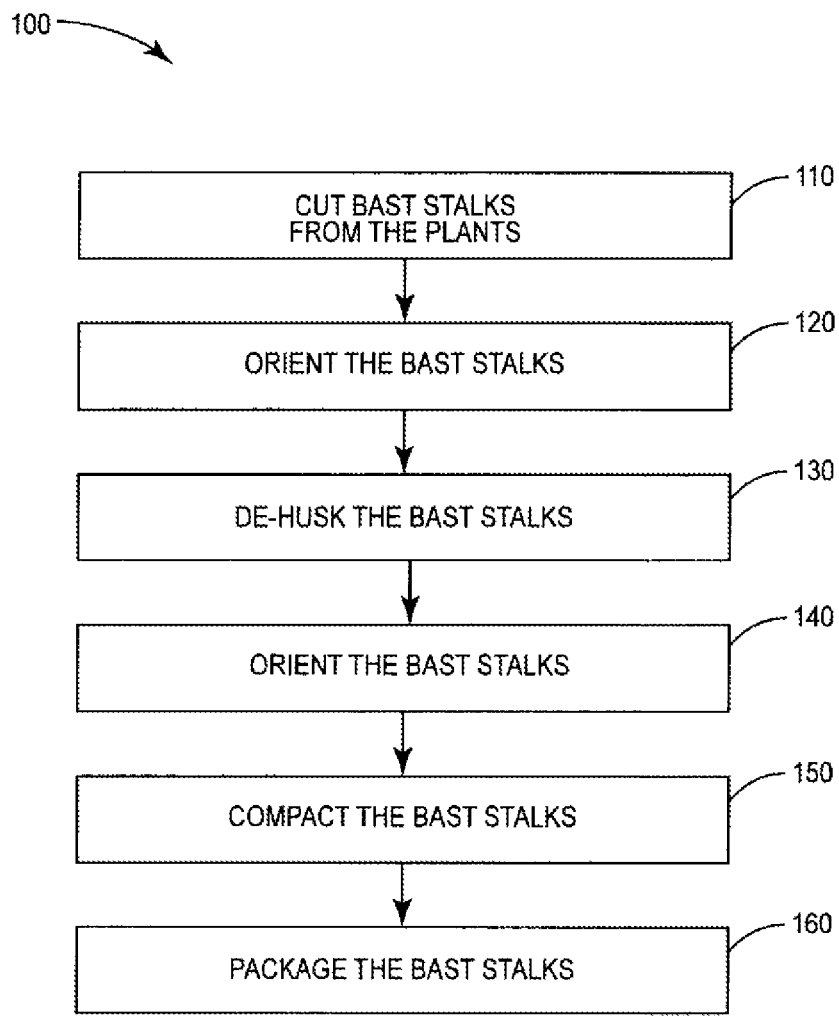
FIG. 1 is a flow chart illustrating a process for harvesting bast stalks in a field according to an embodiment of the invention.

Certain exemplary embodiments of the present invention are described below and illustrated in the accompanying figures. The embodiments described are only for purposes of illustrating the present invention and should not be interpreted as limiting the scope of the invention, which, of course, is limited only by the claims below. Other embodiments of the invention, and certain modifications and improvements of the described embodiments, will occur to those skilled in the art and all such alternate embodiments, modifications, and improvements are within the scope of the present invention.

According to common practice, the various features of the drawings discussed below are not necessarily drawn to scale. Dimensions of various features and elements in the drawings may be expanded or reduced to more clearly illustrate the embodiments of the invention.

FIG. 1 is a flow chart illustrating a process 100 for harvesting bast plants from a field, and orienting the stalks generally parallel to each other for later processing. Although bast plants typically are cut and laid on the field for retting, or transferred to a pond for pond retting, enzymatic treatments may eliminate altogether the need to field and pond rett the stalks. Such enzyme treatments are described in U.S. Patent Application Pub. No. 2010/0147472, the entirety of which is incorporated by reference into this description, International Publication No. WO 2007/140578, the entirety of which is incorporated by reference into this description, and U.S. Patent Application Pub. No. 2010/0285569, the entirety of which is incorporated by reference into this description.

Orienting bast stalks better prepares the bast stalks for decortication, and ultimately fiber preparation and yarn spinning. Having bast stalks aligned in a generally parallel orientation with respect to each other for decortication can improve fiber preparation and yarn spinning. For example, one purpose of fiber preparation, sliver formation, and the drafting processes in yarn spinning is to form fiber assemblies having fibers arranged substantially parallel, and with minimal mass variation along the length of the assembly. Highly aligned fiber assemblies with low mass variation have lower end breaks thereby increasing yarn efficiency, and yielding a stronger, smoother yarn. By aligning the bast stalks in parallel early in the fiber extraction process, the bast fibers obtained via decortication will be better suited to operate on existing cotton and cotton blend yarn spinning systems.

Bast plants harvested as described herein include, but are not limited to, flax, hemp, kenaf, and ramie plants. Further, bast plants intended for either seed or fiber production may be harvested as described herein. Bast plants include an outermost layer referred to as the epidermis, followed by the cortex and then the phloem or parenchyma. The phloem layer contains the longer cells that are the bast fibers. Adjacent the phloem layer is the cambium and pith. The pith is the thick woody core. As will be further detailed below, a combine and/or process for harvesting bast plants extracts the seeds, and initiates the process for extracting the bast fiber cells from the stalks.

As shown in FIG. 1, the process 100 begins by cutting bast stalks from the bast plants in a field with a cutting device further detailed below (block 110). The cut bast stalks may then undergo a first orienting step, which is intended to align a portion of the stalks generally parallel to each other (block 120). The portion of the outermost layers, leafy matter, and the seeds are removed from the stalks, also referred to as de-husking (block 130). The de-husked stalks may then undergo a second orienting step, intended to align a substantial majority of the stalks generally parallel to each other (block 140). The oriented stalks may be compacted (block 150) and then packaged (block 160), e.g., baled into round, square or rectangular bale.

Figure 2:
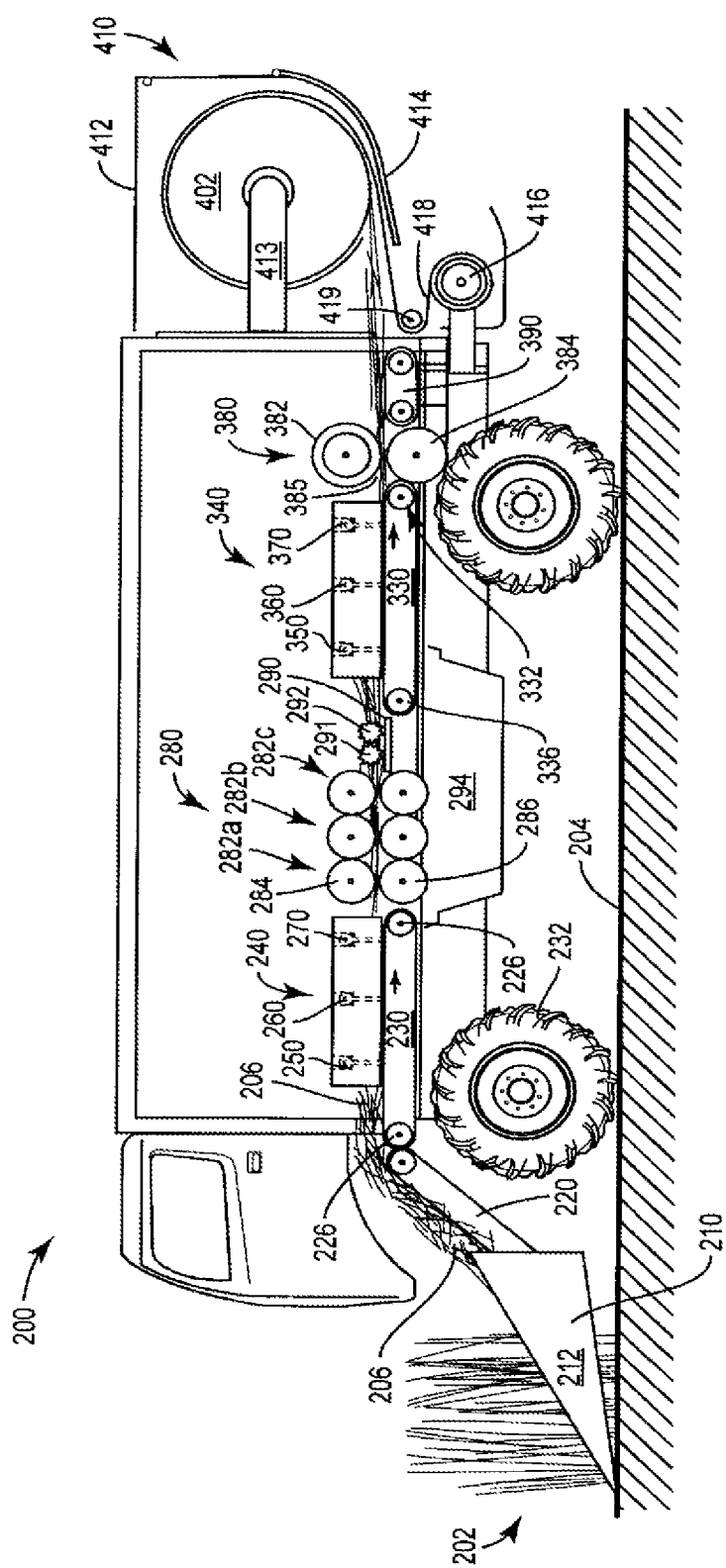
FIG. 2 is an illustration of an apparatus for harvesting bast stalks, with a portion of the apparatus cut-away, according to an embodiment of the invention.

FIG. 2 shows an apparatus 200 used to harvest bast plants from a field according to an embodiment of the invention. The apparatus 200 may be a vehicle, combine, or trailer having wheels that can be pulled behind a vehicle. While an embodiment of the invention is shown as the apparatus 200 for harvesting bast plants, harvesting as described herein may include a process of extracting stalks from plants.

Figure 3:
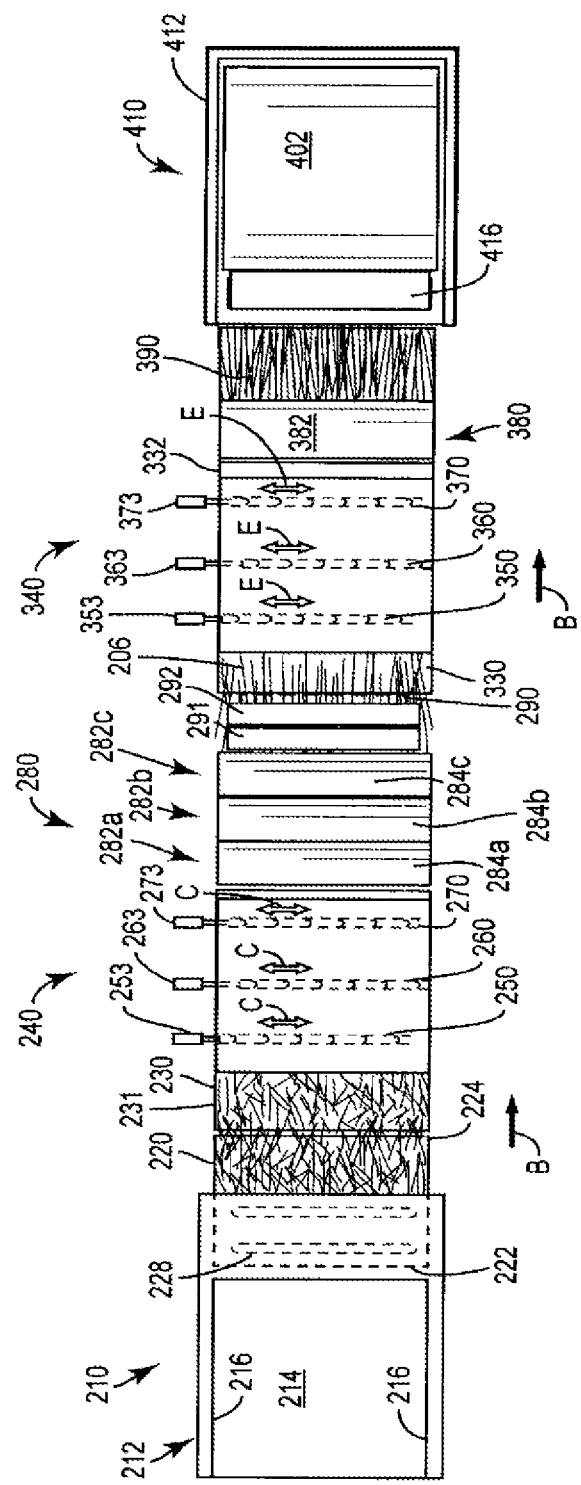
FIG. 3 is a plan view of an apparatus for harvesting bast stalks using the apparatus shown in FIG. 2, with the housing and wheels removed.

As shown in FIGS. 2 and 3, the apparatus 200 is shown as a vehicle and may include a cutting device 210, first transfer belt 220, first orienting belt 230, de-husking device 280, second orienting belt 330, and a baler 410, each of which will be detailed below. As the vehicle 200 passes over the field 204, the cutting device 210 may remove stalks 206 from upstanding bast plants 202 in the field 204. Any conventional cutter for severing and collecting the bast stalks 206 for transfer through the vehicle 200 may be used. In the embodiment shown in FIGS. 2 and 3, the cutting device 210 includes a housing 212 having downwardly extending ramp 214 and walls 216 that guide the cut stalks 206 onto a transfer belt 220. The transfer belt conveys the stalks to the first orienting belt 230.

As shown in FIGS. 2 and 3 the transfer belt 220 has a first end 222 positioned proximate the cutting blades (not shown) in the housing 212, and a second end 224 proximate to the inlet end 231 of the first orienting belt 230, which is above the front wheel 232 of the vehicle (shown in FIG. 2). A plurality of slats 228 on the transfer belt 220 may grab and carry the stalks thereon toward the first belt 230. One or more rollers 226 as shown in FIG. 2 may drive the belt 228. In alternate embodiments, however, any conveying mechanism may be used to transfer the cut bast stalks 206 from the cutter 210 to the first orienting belt 230.

The transfer belt 220 and first belt 230 may be run with a speed differential that facilitates stalk separation during transfer. More specifically, the first belt 230 may be moving at a higher speed than the transfer belt 220, or vice versa. The higher speed first belt 230 separates the bast stalks so that the lower density bast stalks are transported thereon compared to the higher density of bast stalks received on the transfer belt 220 initially.

Figure 5A:
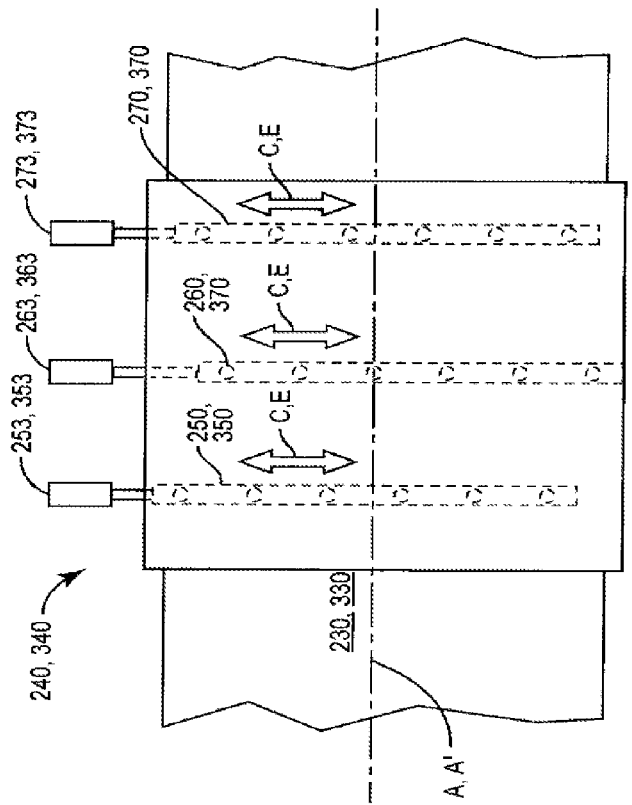
FIG. 5A is a cut away plan view of a belt and chamber for orienting bast stalks shown in FIG. 3.

Continuing with FIGS. 2, and 5A, the first orienting belt 230 begins the process of aligning the stalks 206 parallel to each other. The first belt 230 has a longitudinal axis A that is parallel to the direction B the first belt 230 is moving. Positioned above the belt 230 is a chamber 240 having a plurality of bars 250, 260, and 270 therein. The bars 250, 260, and 270 are elevated above and arranged perpendicularly to the belt 230. The bars 250, 260, and 270 may oscillate back and forth across the belt 230 in the direction C, as indicated by the arrows. The first orienting belt 230 and chamber 240 are similar to second orienting belt 330 and chamber 340 described below. While the first belt 230 is shown in FIGS. 2 and 3 as a single conveyor, the first belt 230 may comprise multiple belts arranged end-to-end, each progressing the bast stalks through the chamber 240 at a different or same speed. In such an embodiment, the speed of each belt may be adjusted to facilitate stalk transportation. For example, the first belt 230 may comprise a first portion and a second portion, wherein the second portion has a speed that is greater than the first portion. When the bast stalks pass from the first portion to the second portion, the bast stalks partially separate from one another.

Figure 5B:
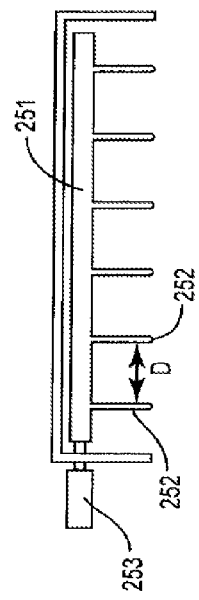
FIG. 5B is a front elevation view of the belt and chamber shown in FIG. 5A.
Figure 4:
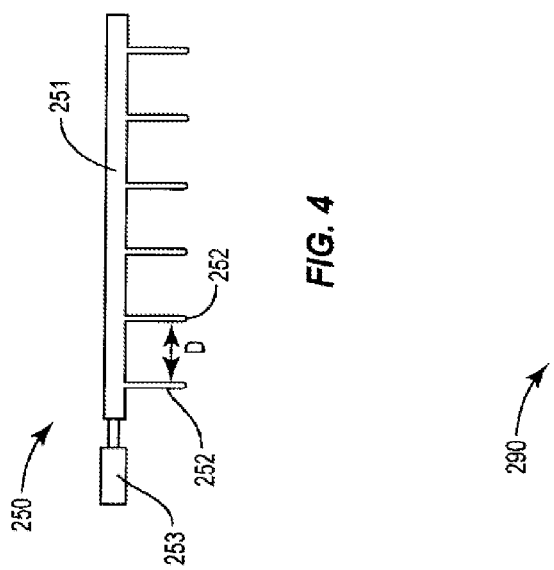
FIG. 4 is an illustration of an orienting bar used in the apparatus shown in FIG. 3.

As shown in FIGS. 4, 5A, and 5B, each bar 250, 260, 270, includes a horizontal support 251, 261, 271 and a plurality of tines 252, 262, 272 that extend downwardly and orthogonally from the support toward the belt 230. Support 261, tines 262, and support 271 and tines 272 are not shown in the figures. Turning to FIG. 4, the tines 252 are spaced apart a distance D to allow bast stalks to pass therethrough. The tines 252 may be connected to the support 251. The tines 252 may also be attached to the support 251 via mechanical fasteners to facilitate repair and replacement.

FIGS. 3 through 5A show how the bars can oscillate across the belt 230. In an embodiment, actuators 253, 263, 273 may cause the bars 250, 260, 270 to move back and forth across the first belt 230 as shown. Actuators may use hydraulic fluid pressure or pneumatic pressure to move the supports across the belt 230. Each of the bars 250, 260, 270 may be independently movable. Further, the bars may oscillate with respect to each other in a coordinated manner to maximize orientation of the bast stalks. For example, the first bar 250 may oscillate at a first frequency and the second bar 260 at a second frequency that is lower than the first frequency. The third bar 270 may oscillate at a lower frequency than the first and second bars 250 and 260, respectively. Frequency refers to the rate the bar completes one cycle back and forth across the belt.

Turning now to FIGS. 2 and 3, as the bast stalks 206 approach the first oscillating bar 250 within the chamber 240, the tines 252 begin to separate and align the stalks within the spacings D. The partially oriented stalks are then presented to the second bar 260 oscillating across the axis A of the belt 230. The tines 262 (not shown) further arrange the stalks within the spacings D to orient the stalks generally parallel to the axis A of the first belt 230. The stalks are then presented to the final bar 270 and tines 272 (not shown), wherein movement of the tines 272 (not shown) and the belt 230 cause further orientation of the bast stalks 206. Although three bars 250, 260 and 270 are shown, more or less may be used.

Returning to FIGS. 2 and 3, the bast stalks exit the chamber 240 and are presented to the de-husking device 280. The de-husking device 280 removes seeds, leafy matter, if any, and portions of the epidermal and cortex layers from the stalks 206. The de-husking device may begin mechanically breaking the wood core of the stalks, which can facilitate fiber extraction later.

Figure 7:
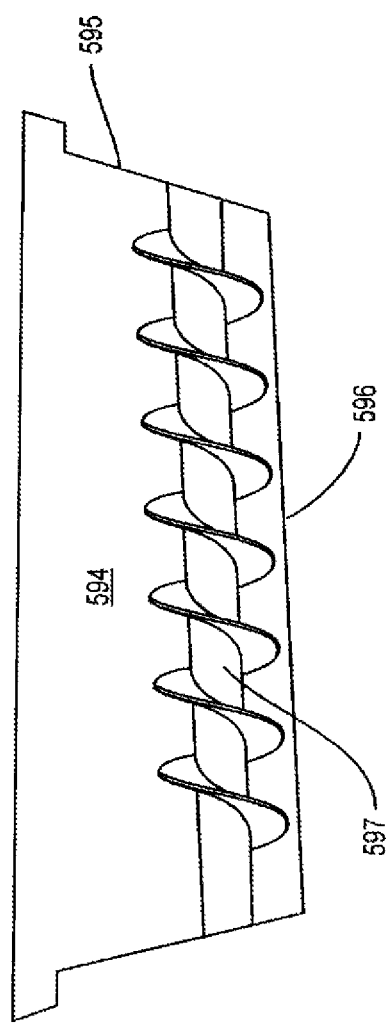
FIG. 7 is an illustration of an alternate hopper design used in the process shown in FIG. 3.

In the embodiment shown in FIGS. 2 and 3, the de-husking device 280 includes a plurality of roller sets 282a, 282b, and 282c that present de-husked stalks to a shaker screen 290. A hopper 294 is positioned below the roller sets 282 and screen 290 to collect materials removed from the stalks. An alternate hopper configuration is shown in FIG. 7, and includes the hopper 594 has walls 595 an inclined bottom 596. A drive auger 597 may be positioned proximate the hopper bottom 596 to remove seeds and debris through an opening (not shown). The hopper 594 may be emptied during stalk harvesting, for example, the vehicle 200 may stop and the hopper emptied as needed.

Each roller set 282 comprises a first roller 284 and a second roller 286 positioned above and proximate to the first roller 284. The rollers 284 and 286 in each set may have a smooth surface as shown. The pressure applied to the stalks as they pass between the first 284 and second 286 rollers may break and release some of the outer layers of stalks, exposing the fiber layer underneath. In other embodiments, the rollers 284 and 286 may be knurled, serrated, have indentions, projections, ridges or other surface configurations to facilitate de-husking the bast stalks. Further, the surface details of the rollers 284 and 286 in each roller set 282 may differ. For example, the first roller 284a may have a smooth surface and the second roller 286a may have ridges. The stalks 206 exit the de-husking device 280 onto a screen 290.

Figure 6:
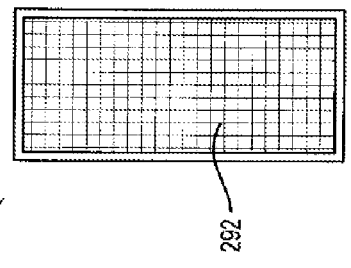
FIG. 6 is an illustration of a screen used in the process shown in FIG. 3.

As shown in FIGS. 2, 3 and 6, the screen 290 is sized to span the space between roller set 282c and the second orienting belt 330. The screen 290 has a plurality of openings 292 (shown in FIG. 6) sized to permit the removed outer skins and seeds to pass therethrough. The screen may be agitated to facilitate passing the removed materials from the stalks 206 through the screen 290 as they are presented to the second orienting belt 330. In an alternate embodiment, the screen 290 can be a belt capable of transporting stalks from the roller set 282c to the belt 330, but having openings to allow outer skins and seeds and the like to pass therethrough to the collection hopper 294. First and second screen rollers 291 and 292 positioned above the screen 290 convey the stalks toward the belt 330. While two rollers are shown, three, four or more such rollers may be used. The collection of outer skins, seeds and leafy materials allows for the reclamation and later processing of the bast seeds. In alternate embodiments, the removed materials may be left on the field.

As shown in FIGS. 2, 3 and 5A, the second orienting belt 330 may further align the bast stalks 206 parallel to each other. The second belt 330 has a longitudinal axis A' that is parallel to the direction the second belt 330 is moving, shown in FIG. 3 by the arrow B. The first and second orienting belts 230 and 330 operate similarly. Rollers 336 may drive the second belt 330. The second belt 330 includes a chamber 340 positioned above the belt 330, and a plurality of bars 350, 360, and 370 elevated above and arranged perpendicularly to belt 330. Each of the bars 350, 360 and 370 are capable of oscillating back and forth across the belt 330 in the direction indicated by the arrows E. The bars 350, 360 and 370 have a similar design and components to the bars 250, 260 and 270 described above and shown in FIGS. 4 and 5B. Further, the bars 350, 360 and 370 may oscillate with respect to each other in a coordinated manner to maximize orientation of the bast stalks on the second belt 330. For example, the first bar 350 may oscillate at a first frequency and the second bar 360 at a second frequency that is lower than the first frequency. The third bar 370 may still oscillate at a lower frequency than the first 350 and second 360 bars.

Continuing with FIGS. 2 and 3, as the bast stalks 206 approach the first oscillating bar 350 within the chamber 340, the tines 352 (not shown) begin to separate and align the stalks within the spacings D. The partially oriented stalks are then presented to the second bar 360 oscillating across the axis A' of the belt 330. The tines 362 (not shown) arrange the stalks within the spacings D to further orient the stalks generally parallel to the axis A' of the second belt 330. The stalks are then presented to the final bar 370 and tines 372 (not shown), wherein movement of the tines 372 (not shown) and the belt 340 cause further orientation of the bast stalks 206. Although three bars 350, 360 and 370 are shown, more or less may be used. The bast stalks exit the chamber 340 substantially parallel to the longitudinal axis A' of the second belt 330.

As shown in FIGS. 2 and 3, the oriented bast stalks may be compacted via compaction rollers 380. The rollers include a first roller 382 positioned above and in contact with the second roller 384 and forming a nip 385 therebetween. The nip 385 is positioned near and at about the same elevation as the exit end 332 of the second orienting belt 330. The position of the nip 385 allows the rollers 380 to grab and compress the oriented bast stalks, and then present the compacted bast stalk assembly to the transfer belt 390. In the embodiment shown in FIGS. 2 and 3, the first roller 382 may be compliant to compress the bast stalks against the second roller 384 surface. In other alternate embodiments, the first 382 and second 384 rollers may be compliant.

The second belt 390 transfers the compacted bast stalks to packaging. Continuing with FIGS. 2 and 3, the compacted bast stalks are shown packaged into a bale 402 using a round baler 410. The baler 410 includes housing 412, accumulating guide 413, moveable door 414, and a wrap device 416 positioned below the housing 412 and proximate the second transfer belt 390. The stalks are presented to the baler 410 and accumulated using the guide 413 within the housing 414. When a certain mass of stalks have been accumulated in the housing 412, wrap 418 is unwound from the wrap device 416, passes over guide rollers 419, and surrounds the bale 402. A sensor (not shown) may detect when wrapping is complete, initiate instructions to cut the wrap 418, and activate the moveable door to release the bale 402 onto the field 204. While a round baler is shown, the oriented bast stalks may be packaged any number of ways that maintain the parallel orientation of the stalks, e.g. a square, rectangular bale.

The harvester may package the bales with desired properties that facilitate later processing. The bale density (lb/ft$^3$) may be adjusted to better facilitate opening, separation and orientation of the bast stalks, depending on the conditions of the bale. For example, the moisture content of the bale may impact bale density; as the moisture content of the bale increases, the density of the bale should be decreased, which would impact later processing. A compact, dense bale may require more aggressive opening and separating to facilitate alignment later in the process compared to bales with a lower density. Conversely, bales with a lower density may need less aggressive opening and/or separation to facilitate bast stalk alignment later in the process. In alternative embodiments, when square or rectangular bales are used, a baler may compact and orient the stalk therein for later processing. For example, a bale compactor can have surface with a plurality of extending rods having a plunger at the distal end thereof. As the compactor compresses the bales, the rods and plungers begin to orient the stalks within the square/rectangular bale. In other embodiments, the oriented bast stalks may be arranged in a hopper (not shown).

Although the present invention has been described with exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

What is claimed is:

1. A harvester for harvesting bast stalks, the harvester comprising:
    at least one cutting device configured to receive bast stalks and comprising at least one cutter at a front end of the harvester, the at least one cutter configured to cut bast stalks from bast plants;
    a first moving belt having a first end for receiving the cut bast stalks from the at least one cutter, a second end, and a top surface configured to move the cut bast stalks between the first end and the second end;
    a plurality of sets of spaced tines extending toward the top surface of the first moving belt and disposed laterally across the first moving belt between a first side and a second side of the first moving belt to orient a substantial majority of the bast stalks generally parallel to each other and generally along the direction the first moving belt is configured to move, each set of spaced tines in the plurality of sets of spaced tines being affixed to and supported by a respective bar of a plurality of bars elevated above the first moving belt and substantially perpendicular to a length of the first moving belt extending between the first end and the second end, wherein the plurality of sets of spaced tines extend from the plurality of bars toward the first moving belt, the tines in each set of spaced tines are connected at proximal ends to the respective bar, and distal ends of the tines in each set of spaced tines form a line parallel to and proximate the top surface of the first moving belt; and
    at least one actuator connected to the plurality of bars and configured to move the plurality of bars back and forth across the first moving belt in a direction generally perpendicular to the direction the first moving belt is configured to move, the at least one actuator configured to move the plurality of bars in such a way that operation of the actuator moves the line of the distal ends of the tines along a linear path parallel to and proximate the top surface of the first moving belt.

2. The harvester of claim 1, further comprising a de-husking device at the second end of the first moving belt through which the bast stalks pass through, the de-husking device comprising a plurality of roller sets.

3. The harvester of claim 2, further comprising:
    a second moving belt positioned to receive the de-husked bast stalks from the de-husking device, the second belt having an exit end; and
    an apparatus at the exit end of the second moving belt for handling the oriented bast stalks.

4. The harvester of claim 1, comprising a baler for packaging the bast stalks.

5. The harvester of claim 2, wherein the harvester comprises a hopper adjacent the de-husking device for receiving materials removed from the bast stalks with the de-husking device.

6. The harvester of claim 3, further comprising a compactor at the exit end of the second moving belt to compact the bast stalks.

7. The harvester of claim 1, wherein a distance between the distal ends of the plurality of sets of spaced tines and the top surface of the first moving belt remains constant during actuation of the at least one actuator.

8. The harvester of claim 1, wherein the plurality of bars are oriented substantially parallel to each other.

9. The harvester of claim 1, wherein the plurality of sets of tines comprise rigid tines.

* * * * *